United States Patent
Ramachandran et al.

(10) Patent No.: US 9,336,440 B2
(45) Date of Patent: May 10, 2016

(54) POWER EFFICIENT USE OF A DEPTH SENSOR ON A MOBILE DEVICE

(71) Applicant: QUALCOMM Incorporated, San Diego, CA (US)

(72) Inventors: Mahesh Ramachandran, San Jose, CA (US); Shankar Sadasivam, San Diego, CA (US); Ashwin Swaminathan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/552,183

(22) Filed: Nov. 24, 2014

(65) Prior Publication Data

US 2015/0146926 A1 May 28, 2015

Related U.S. Application Data

(60) Provisional application No. 61/908,443, filed on Nov. 25, 2013.

(51) Int. Cl.
*G06K 9/00* (2006.01)
*G06F 3/01* (2006.01)
(Continued)

(52) U.S. Cl.
CPC ............ *G06K 9/00624* (2013.01); *G06F 3/012* (2013.01); *G06T 7/208* (2013.01); *H04N 5/23248* (2013.01); *H04N 13/025* (2013.01);
(Continued)

(58) Field of Classification Search
USPC ......................................... 382/103, 106, 154
See application file for complete search history.

(56) References Cited

U.S. PATENT DOCUMENTS 7,725,547 B2 * 5/2010 Albertson ............... G06F 3/016
382/107
9,171,200 B2 * 10/2015 Subramanian .......... G06F 3/011
(Continued)

FOREIGN PATENT DOCUMENTS

WO 2013091245 A1 6/2013
WO 2014120613 A1 8/2014
(Continued)

OTHER PUBLICATIONS

Besl P. J., et al., "A Method for Registration of 3-D Shapes," IEEE Transactions on Pattern Analysis and Machine Intelligence, vol. 14, No. 2, Feb. 1992, pp. 239-256.
(Continued)

*Primary Examiner* — Alex Liew
(74) *Attorney, Agent, or Firm* — Silicon Valley Patent Group LLP (57) ABSTRACT

Systems, apparatus and methods in a mobile device to enable and disable a depth sensor for tracking pose of the mobile device are presented. A mobile device relaying on a camera without a depth sensor may provide inadequate pose estimates, for example, in low light situations. A mobile device with a depth sensor uses substantial power when the depth sensor is enabled. Embodiments described herein enable a depth sensor only when images are expected to be inadequate, for example, accelerating or moving too fast, when inertial sensor measurements are too noisy, light levels are too low or high, an image is too blurry, or a rate of images is too slow. By only using a depth sensor when images are expected to be inadequate, battery power in the mobile device may be conserved and pose estimations may still be maintained.

26 Claims, 9 Drawing Sheets

(51) Int. Cl.
  *H04N 5/232* (2006.01)
  *H04N 13/02* (2006.01)
  *G06T 7/20* (2006.01)

(52) U.S. Cl.
  CPC ........ *H04N 13/0271* (2013.01); *G06T 2200/04* (2013.01); *G06T 2207/10016* (2013.01); *G06T 2207/10028* (2013.01); *G06T 2207/20076* (2013.01)

(56) References Cited

U.S. PATENT DOCUMENTS

| | | | |
|---|---|---|---|
| 2005/0031166 A1* | 2/2005 | Fujimura | G06K 9/00369 382/103 |
| 2007/0110298 A1* | 5/2007 | Graepel | G06K 9/00355 382/154 |
| 2011/0080336 A1* | 4/2011 | Leyvand | A63F 13/06 345/156 |
| 2012/0027290 A1* | 2/2012 | Baheti | G06K 9/6857 382/154 |
| 2012/0117514 A1* | 5/2012 | Kim | G06F 3/011 715/849 |
| 2012/0196679 A1 | 8/2012 | Newcombe et al. | |
| 2012/0327218 A1 | 12/2012 | Baker et al. | |
| 2013/0083972 A1 | 4/2013 | Ko | |
| 2013/0156264 A1* | 6/2013 | Martensson | G06T 7/0075 382/103 |
| 2013/0229491 A1 | 9/2013 | Kim et al. | |
| 2013/0244782 A1 | 9/2013 | Newcombe et al. | |
| 2013/0266174 A1* | 10/2013 | Bleiweiss | G06K 9/4604 382/103 |
| 2013/0343611 A1* | 12/2013 | Subramanian | G06F 3/011 382/103 |
| 2014/0267631 A1 | 9/2014 | Powers et al. | |

FOREIGN PATENT DOCUMENTS

| | | |
|---|---|---|
| WO | 2014133691 A1 | 9/2014 |
| WO | 2014178836 A1 | 11/2014 |

OTHER PUBLICATIONS

Newcombe R. A., et al., "KinectFusion: Real-Time Dense Surface Mapping and Tracking," Proceedings of the 2011 10th IEEE International Symposium on Mixed and Augmented Reality (ISMAR '11), 2011, pp. 127-136.
International Search Report and Written Opinion—PCT/US2014/067432—ISA/EPO—Apr. 2, 2015.

* cited by examiner

POWER EFFICIENT USE OF A DEPTH SENSOR ON A MOBILE DEVICE

CROSS-REFERENCE TO RELATED APPLICATIONS

This application claims the benefit of and priority under 35 U.S.C. §119(e) to U.S. Provisional Application No. 61/908,443, filed Nov. 25, 2013, and entitled "Power efficient use of a depth sensor on a mobile device," which is incorporated herein by reference in its entirety.

BACKGROUND

I. Field of the Invention

This disclosure relates generally to systems, apparatus and methods for minimizing power consumption of a depth sensor on a mobile device, and more particularly to enabling a depth sensor only when sensor measurements indicate images are inadequate for pose calculation.

II. Background

Motion estimation and trajectory estimation of a mobile device using available sensors have a wide range of important applications. Motion estimation over a short period (e.g., a few milliseconds) is important in de-blurring and super-resolution. Trajectory estimation over an extended period (e.g., a few seconds) is useful in augmented reality (AR), short-range navigation and location estimation. Low-light situations affect both motion estimation and trajectory estimation.

Applications often use inertial sensors for these situations because an inertial sensor measures motion at a higher rate than does a camera. Inertial sensors, however, have inherent biases and other sources of error that add challenges when performing "dead reckoning" without regular bias correction. That is, updating of the bias states of an inertial measurement unit (IMU) need continuous pose estimates. A mobile device may compute a six-degrees-of-freedom (6DoF) pose trajectory using inertial sensor measurements. A 6DoF pose computation considers up-down (heave), right-left (sway) and forward-backward (surge) translation movement as well as forward-backward tilt (pitch), left-right swivel (yaw) and side-to-side pivot (roll) rotation movement. The mobile device may integrate this movement for several 100 milliseconds.

In an example, assume a mobile device includes no pose correction to the IMU, thus providing biased inertial sensor measurements. Integrating such inertial sensor measurements over the short term and long term leads to errors that adversely affect results. For example, assume a 10-frame per second (fps) frame rate of video leads to an exposure time of 100 milliseconds (ms) for each image in the video. Assume further that a 6DoF pose of the mobile device is computed using only inertial sensor measurements and without correcting inertial sensor measurements from the IMU. Such computations will give rise to both pose errors and outdated bias estimates for the IMU.

If inertial sensor error states are periodically corrected with measurements from a non-IMU device, such as a camera, a mobile device may make both better motion estimates and trajectory estimates. Furthermore, the inertial sensor error states may be corrected with such devices. Such non-IMU devices, however, are not continuously available. For example, during periods of camera outage or long image exposure in a visual-inertial tracking system, a camera may not provide pose corrections and inertial-state corrections frequently enough. Another non-camera device may fill this gap to better maintain pose and inertial-state corrections. Such pose and inertial-state corrections may also enhance operation of a recursive filter, such as an extended Kalman filter (EKF), commonly employed to maintain estimates of pose and inertial states.

Some visual-inertial tracking systems that include tracking applications use both inertial sensor measurements from an inertial sensor and images from a camera. Infrequent camera updates, however, may lead to corrupt inertial error states. In turn, the corrupt inertial error states may lead to periods of camera tracking outages due to inaccurate motion prediction. Without assistance from another device during these outages, motion integrated from inertial sensor measurements may be susceptible to bias drift. Furthermore, filter states as a whole may diverge in an unbounded fashion from their true values.

For example, if a camera pose is not available to update inertial states for 6 frames, in a 30-fps video stream, 200 milliseconds (ms) may pass where no correction of states from an non-camera device may occur. During this 200-ms period, an EKF pose estimates and inertial state estimates may drift away from their true values leading to a failure of the EKF. With such a failure, a user application that depends on the EKF inertial state estimates may similarly fail.

In order to alleviate these shortcomings prevalent in visual-inertial tracking systems, embodiments provide pose corrections to an EKF during periods of camera outages when image-based pose measurements are unavailable for longer than 100 ms (e.g., >150 ms). Such pose estimates from non-camera devices may significantly improve the robustness of visual-inertial tracking systems by providing corrective measurements to the EKF. Embodiments described herein provide a correction mechanism from a depth sensor as a non-camera device.

BRIEF SUMMARY

Disclosed are systems, apparatus and methods for powering a depth sensor only when other modalities are inadequate to maintain pose computations used in motion and tracking algorithms.

According to some aspects, disclosed is a method in a mobile device for tracking pose of the mobile device, the method comprising: receiving, from an image capture device, a plurality of images; computing a pose based at least in part on one of the plurality of images; sending the pose to a pose tracking filter module; comparing a first measurement to a first threshold to determine that the first measurement exceeds the first threshold; enabling a depth sensor based, at least in part, on comparing the first measurement; receiving a first depth map; computing a depth sensor pose based in part on the first depth map; and providing the depth sensor pose to the pose tracking filter module.

According to some aspects, disclosed is a mobile device for tracking pose, the mobile device comprising: an image capture device configured to capture a plurality of images; a pose module coupled to the image capture device and configured to compute a pose based at least in part on one of the plurality of images; a depth sensor configured to send a first depth map; a comparator module configured to compare a first measurement to a first threshold to determine that the first measurement exceeds the first threshold; a depth sensor trigger module coupled to the depth sensor and the comparator module, and configured to enable the depth sensor based, at least in part, on comparing the first measurement; a depth sensor pose module coupled to the depth sensor and configured to compute a depth sensor pose based in part on the first depth map; and a pose tracking filter module: coupled to the pose module and the depth sensor pose module; configured to receive the pose and the depth sensor pose; and provide an estimated pose.

According to some aspects, disclosed is a mobile device for tracking pose of the mobile device, the mobile device comprising: means for receiving, from an image capture device, a plurality of images; means for computing a pose based at least in part on one of the plurality of images; means for sending the pose to a pose tracking filter module; means for comparing a first measurement to a first threshold to determine that the first measurement exceeds the first threshold; means for enabling a depth sensor based, at least in part, on comparing the first measurement; means for receiving a first depth map; means for computing a depth sensor pose based in part on the first depth map; and means for providing the depth sensor pose to the pose tracking filter module.

According to some aspects, disclosed is a non-transient computer-readable storage medium including program code stored thereon, comprising program code for a mobile device for tracking pose of the mobile device, the program code comprising code to: receive, from an image capture device, a plurality of images; compute a pose based at least in part on one of the plurality of images; send the pose to a pose tracking filter module; compare a first measurement to a first threshold to determine that the first measurement exceeds the first threshold; enable a depth sensor based, at least in part, on comparing the first measurement; receive a first depth map; compute a depth sensor pose based in part on the first depth map; and provide the depth sensor pose to the pose tracking filter module.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWING

Embodiments of the invention will be described, by way of example only, with reference to the drawings.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Position determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

As used herein, a mobile device, sometimes referred to as a mobile station (MS) or user equipment (UE), such as a cellular phone, mobile phone or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile device" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile device."

Camera-based pose estimation uses a sequence of images or plurality of images to estimate pose. A pose may be an absolute orientation or an orientation relative to a camera or other image capture device. The pose may indicate a two-dimensional (2D) orientation or a three-dimensional (3D) orientation. In some embodiments, the combination of both position and orientation is referred to as the pose of an object. In other embodiments, only orientation is referred to as the pose of an object. Often an uncalibrated 2D camera may be used to compute a 3D pose. An uncalibrated 2D camera is not calibrated to a world coordinate system and thus provides a relative pose. A calibrated 2D camera is calibrated to a world coordinate system to provide an absolute pose. The 3D rotation and translation of a 3D object may be estimated from a single 2D image, assuming a 3D model of the 3D object is known and the corresponding points in the 2D image are determined.

The pose estimates may be needed at a high rate but actually are produced too slowly (for example, in low light conditions). When the sequence of images arrives too slowly, substantial gap may form a between images. In these situations, camera-based pose estimation alone or other pose estimation based on an image capture device may provide erroneous pose estimates during these gaps.

A depth sensor may be used in place of or to supplement pose estimates. In doing so, a depth sensor may reduce time gaps between camera-based pose estimations, such as when camera images or images from an image capture device become infrequent. A depth sensor in a mobile device, however, consumes a tremendous amount of power that may quickly drain a battery with prolonged use. Due to the power requirements of a depth sensor, methods, apparatus and systems utilize depth sensors in a power efficient manner as described below. Embodiments propose powering a depth sensor for depth measurements during a triggering event (e.g., when movement is too fast, when noise in an image is above a threshold, when entering low-light conditions, when an image is too blurry, just before gaps are expected to appear between images, when gaps above a threshold actually appear, etc.).

Figure 1:
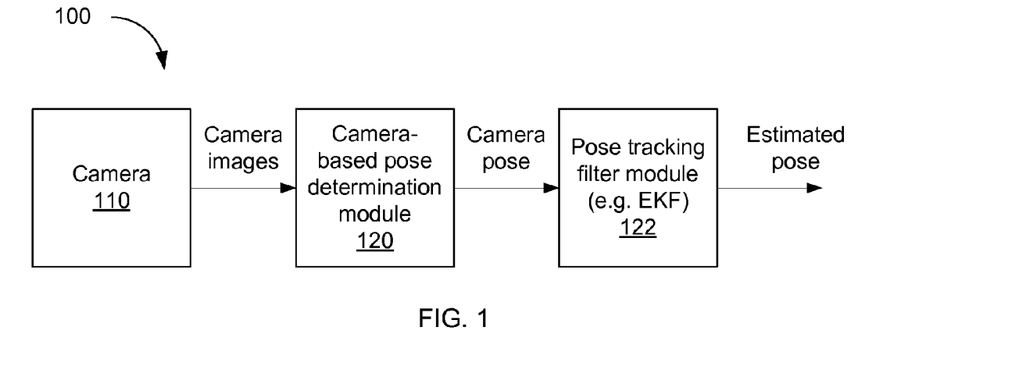
FIG. 1 shows a block diagram of processing in a mobile device without a depth sensor.

FIG. 1 shows a block diagram of processing in a mobile device 100 without a depth sensor. The mobile device 100 contains an image sensor (e.g., an RGB sensor, a camera 110, etc.), a pose module (e.g., a camera-based pose determination module 120) and a filter (e.g., a pose tracking filter module 122, EKF, a particle filter, an unscented Kalman filter, a Sigma-Point Kalman Filter, a Linear Regression Kalman Filter, a Central Difference Kalman Filter, a Divided Difference Filter, a Square-Root filter, etc.).

The camera 110, or other image capture device, provides camera images to the camera-based pose determination module 120. The camera-based pose determination module 120 uses the camera images to determine a camera pose of the mobile device 100. Pose may be determined from a POS (Pose from Orthography and Scaling) algorithm. One such iterative algorithm, POSIT (POS with Iterations), may determine a pose within a few iterations.

The camera-based pose determination module 120 feeds the camera pose to the pose tracking filter module 122. The pose tracking filter module 122 estimates a pose of an camera based on a camera image of an object. In some embodiments, a pose is estimated using only one or more images from a camera 110 without inertial sensor measurements from an IMU. In other embodiments, a pose is estimated using a combination of both inertial sensor measurements from an IMU and one or more images from a camera 110. The pose tracking filter module 122 (with one input port) accepts a single pose input. The pose may then be used to compute a pose correction for the EKF and/or an inertial-state correction factor for a processor and/or a bias correction for the IMU.

Unfortunately in some situations, such as in low-light or no-light situations, the camera 110 cannot provide camera images fast enough to the camera-based pose determination module 120. In other situations, the images from the camera 110 are not adequate enough (e.g., too noisy, too blurry, too dark) for the camera-based pose determination module 120 to reliably compute a camera pose. Therefore, the pose tracking filter module 122 does not receive enough fresh camera poses during this period and may rely on stale camera pose information.

Figure 2:
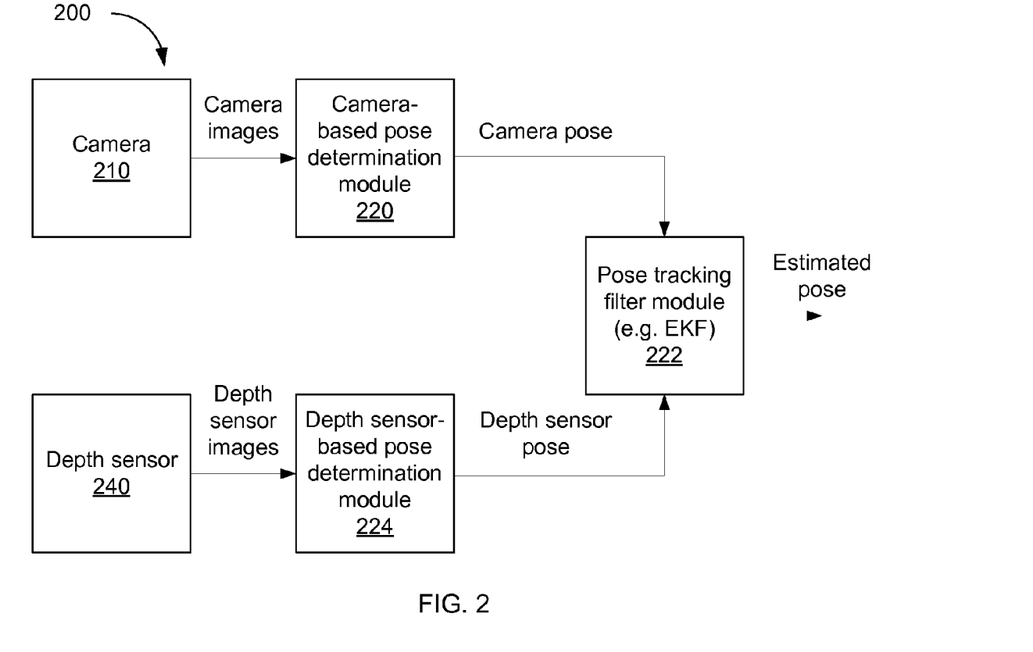
FIG. 2 shows a block diagram of processing on a mobile device with a depth sensor.

FIG. 2 shows a block diagram of processing on a mobile device 200 with a depth sensor 240. A depth sensor 240 supplements a camera 210, or similar image capture device, so a pose tracking filter module 222 always receives a camera pose (determined from at least one image of a camera 210) and/or a depth-sensor pose (determined from a depth sensor 240). In some cases, both the camera 210 and the depth sensor 240 are powered on.

Unlike the mobile device 100, the mobile device 200 contains a camera 210, a camera-based pose determination module 220 and a pose tracking filter module 222. The camera 210 also contains a depth sensor 240 and a depth sensor-based pose determination module 224. As described above, the camera 210 (similar to camera 110) provides one or more camera images to a camera-based pose determination module 220, which determines a camera pose.

Similarly, the depth sensor 240 provides a depth map (also referred to as a depth sensor map or a depth sensor image) to the depth sensor-based pose determination module 224. The depth sensor-based pose determination module 224 determines a depth sensor pose from one or more depth maps. The pose tracking filter module 222 (with two input ports) receives both camera pose and the depth sensor pose and determines an estimated pose. The pose tracking filter module 222 may also receive inertial sensor measurements from other sensor such as a magnetometer or compass, a step sensor, a proximity sensor, a GNSS sensor, and/or the like.

Unfortunately, a mobile device 200 with a constantly enabled depth sensor 240 consumes an inordinate level of power, which may prematurely drain a battery in the mobile device 200. A solution to this excessive power consumption is to automatically enable and use a depth sensor 240 only when actually needed.

Figure 3A:
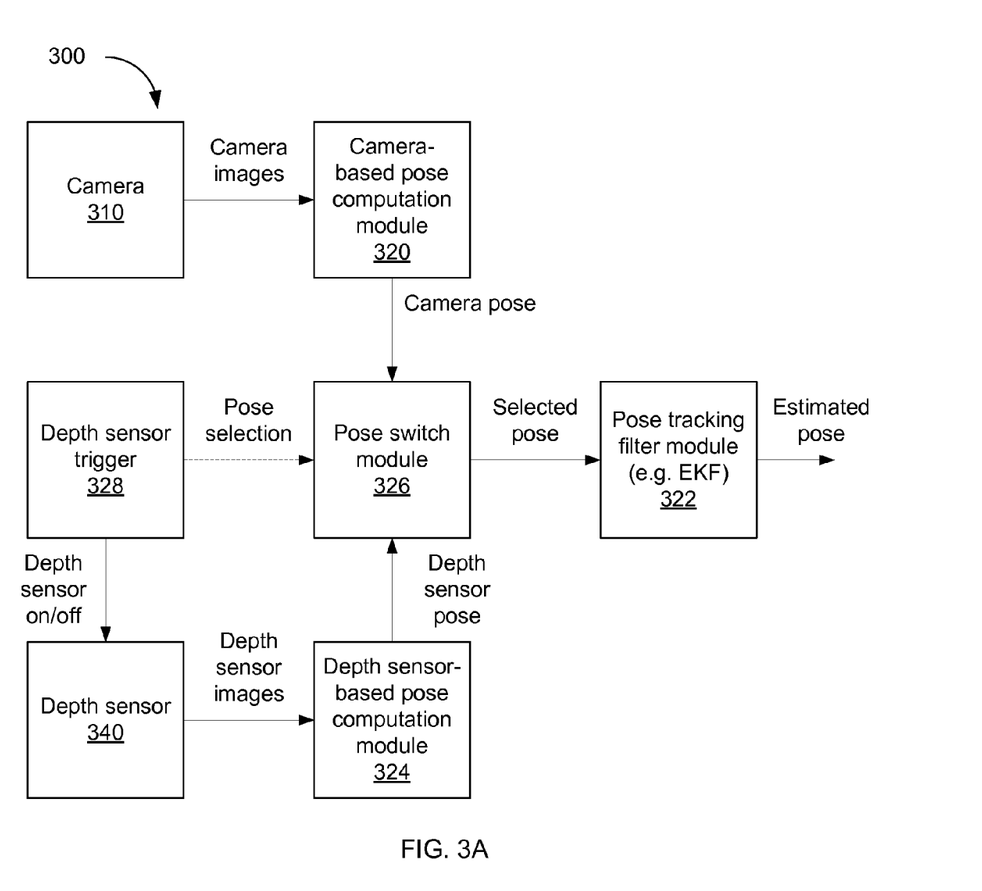
FIGS. 3A and 3B illustrate functional modules of a mobile device to minimize use of a depth sensor, in accordance with some embodiments of the present invention.

FIG. 3A illustrates functional modules of a mobile device 300 to minimize use of a depth sensor 340, in accordance with some embodiments of the present invention. The mobile device 300 includes a camera 310, a camera-based pose determination module 320, a pose tracking filter module 322, a depth sensor 340, and a depth sensor-based pose determination module 324, as described above in mobile device 200.

The mobile device 300 also includes a depth sensor trigger module 328 and a pose switch module 326. Based on a depth sensor on/off signal from the depth sensor trigger module 328, the depth sensor 340 is either enabled or disabled. When enabled, the depth sensor 340 provides depth sensor images to the depth sensor-based pose determination module 324, as described above with reference to the depth sensor-based pose determination module 224. When disabled, the depth sensor 340 consumes no or little power as compared to when enabled.

The depth sensor trigger module 328 also sends an optional pose selection signal to the pose switch module 326. Based on the pose selection signal, the pose switch module 326 selects either the camera pose or the depth sensor pose as the selected pose. The selected pose is fed to the pose tracking filter module 322, which provides an estimated pose based on the current and past selected poses.

In some embodiments, the pose switch module 326 selects the depth sensor pose when the camera images are (or expected to be) too noisy, too dark, too bright, too burry, or too infrequent. In some embodiments, the pose switch module 326 selects the depth sensor pose when available and the camera pose when the depth sensor pose is not available. In these embodiments, a pose selection signal is optional.

Figure 3B:
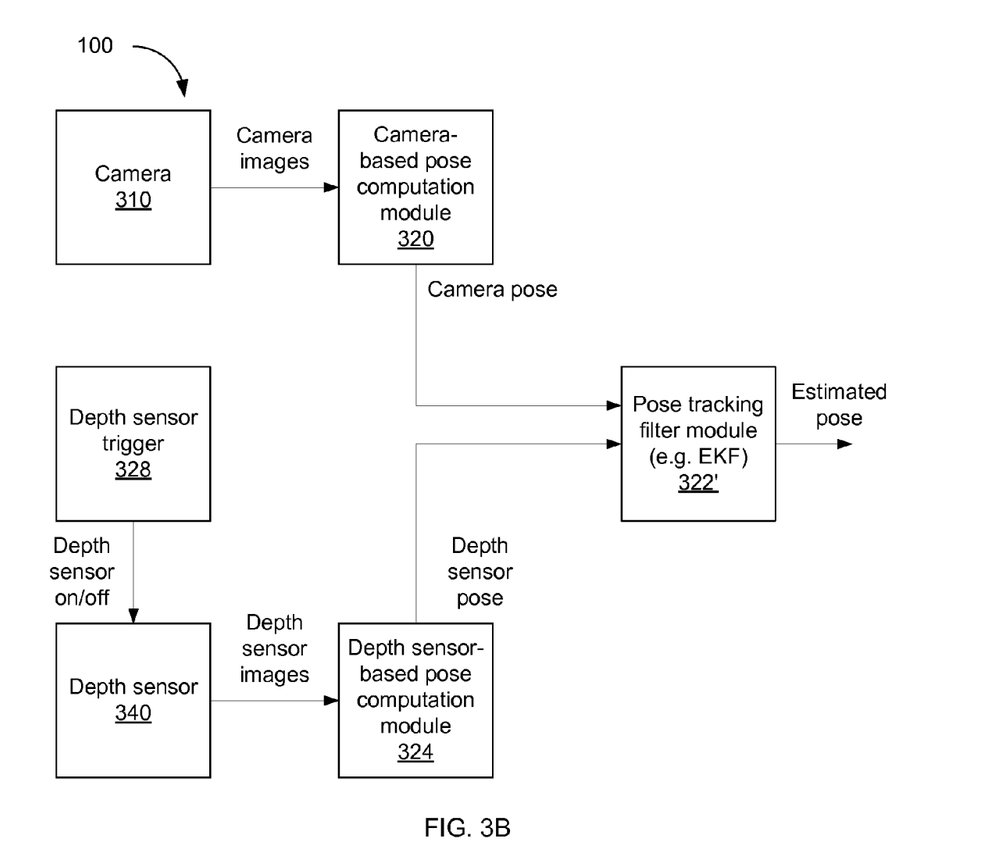

A pose switch module 326 may select a depth sensor pose when available and a camera pose when the depth sensor pose is not available. Alternatively, instead of a pose tracking filter module 322 with a single input port, a mobile device 300 may include a pose tracking filter module 322' with two input ports as shown in FIG. 3B. In such embodiments, a mobile device 300 no longer uses a pose switch module 326 or a pose selection signal from a depth sensor trigger module 328. Instead, the EKF or the pose tracking filter module 322' may include an internal selection or weighted selection between these two input ports.

In FIG. 3B, a pose tracking filter module 322' receives both the camera pose and the depth sensor pose at its input ports and provides an estimated pose at its output port. The mobile device 300 includes a camera 310, or similar image capture device, feeding a camera-based pose determination module 320. The camera-based pose determination module 320 includes outputs a camera pose as described above.

The mobile device 300 also includes a depth sensor trigger module 328, a depth sensor 340 and a depth sensor-based pose determination module 324, as described above. The depth sensor trigger module 328 enables and disables the depth sensor 340. When enabled by the depth sensor trigger module 328, the depth sensor 340 consumes power. When disabled by the depth sensor trigger module 328, the depth sensor 340 is in a low-power to no-power consuming state. The depth sensor 340 feeds the depth sensor-based pose determination module 324. The depth sensor-based pose determination module 324 outputs a depth sensor pose. The mobile device 300 also includes a pose tracking filter module 322', which accepts both the camera pose and the depth sensor pose, when available, at input ports and outputs an estimated pose.

Figure 4:
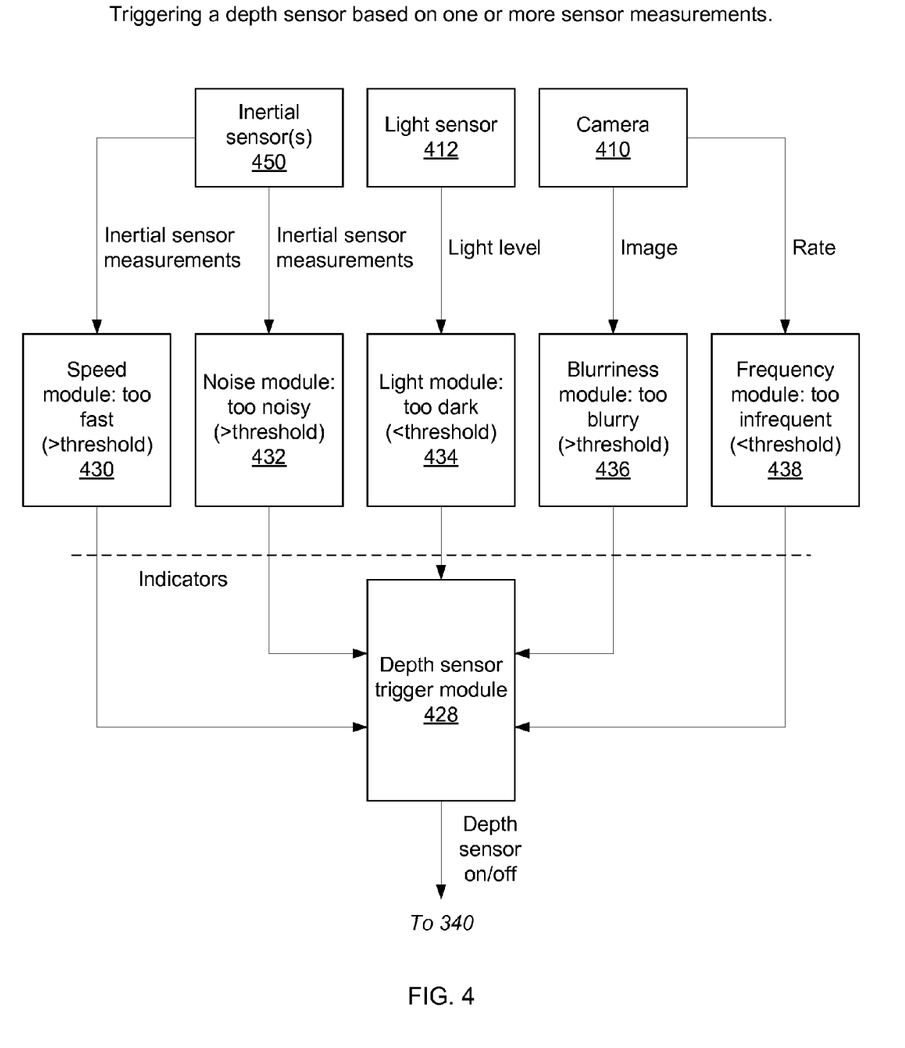
FIG. 4 illustrates reasons to trigger a depth sensor, in accordance with some embodiments of the present invention.

FIG. 4 illustrates reasons to trigger a depth sensor 340, in accordance with some embodiments of the present invention. Some embodiments of a depth sensor trigger module 428, similar to depth sensor trigger module 328, receives a single cause for enabling or disabling the depth sensor 340. Other embodiments include a depth sensor trigger module 428 that receives two or more causes for enabling or disabling the depth sensor 340. The depth sensor trigger module 428 may operate on a single trigger or indicator. The depth sensor trigger module 428 may operate on one or more logical AND and/or logical OR gates with two or more indicators. The depth sensor trigger module 428 may require certain inputs to turn on a depth sensor 340 and other inputs to turn off the depth sensor 340.

A depth sensor trigger module 428 may be toggled based on measurements from a sensor, such as one or more inertial sensors 450, a light sensor 412 and/or a camera 410 (similar to camera 310 or similar image capture device). For example, an acceleration or speed module 430 determines whether inertial sensor measurements represent a rate of angular velocity or angular acceleration, or a rate of linear velocity or linear acceleration or speed from the inertial sensors 450 that are above or below a threshold and considers this motion of the mobile device 300 too fast. Such fast motion is expected to lead to motion blur and/or other degradations in an image from the camera 410 and images for pose calculation may be ignored or supplemented. For example, a mobile device 300 accelerating above a threshold or at a speed greater than a threshold may indicate images from the camera 410 are expected to be too blurry or otherwise inadequate (e.g., due to light levels or motion blurring).

A noise module 432 determines whether inertial sensor measurements from the inertial sensors 450 are above a threshold noise level and therefore the inertial sensor measurements are too noisy and an image is expected to be too blurry. A light module 434 determines whether a light level from the light sensor 412 is below or above a threshold and therefore images from the camera 410 are expected to be too dark or too bright and/or infrequent. The light level may also be computed from an image from the camera 410 or alternatively from a separate sensor measuring a level of ambient light (e.g., from a light meter or an ambient light sensor). A blurriness module 436 determines whether an image from the camera 410 is above a blurriness threshold and therefore the image is too blurry to use in pose calculations. A frequency module 438 determines whether images from the camera 410 are arriving at a frame rate that is below a threshold and therefore the rate of the images is too low to use in pose calculations. For example, the arrival frame rate is one image each 250 ms but the threshold is 150 ms. In this example, images are arriving too infrequently to provide adequate pose estimates.

The depth sensor trigger module 428 receives an indicator from one or more of these modules (i.e., modules 430-438) to trigger enabling or disabling of the depth sensor 340. If more than one module is implemented, the depth sensor trigger module 428 may act like an OR gate and/or an AND gate where any one or a particular combination of the modules can trigger the depth sensor 340. If only one module is implemented, the indicator from the module may be directly used to trigger the depth sensor 340 without a need for a separate depth sensor trigger module 428. A module (e.g., any of modules 430-438) may also contain a hysteresis such that a measurement must fall above (or below) a first threshold to enable an indicator but must fall below (or above) a second threshold to disable the indicator.

Figure 5:
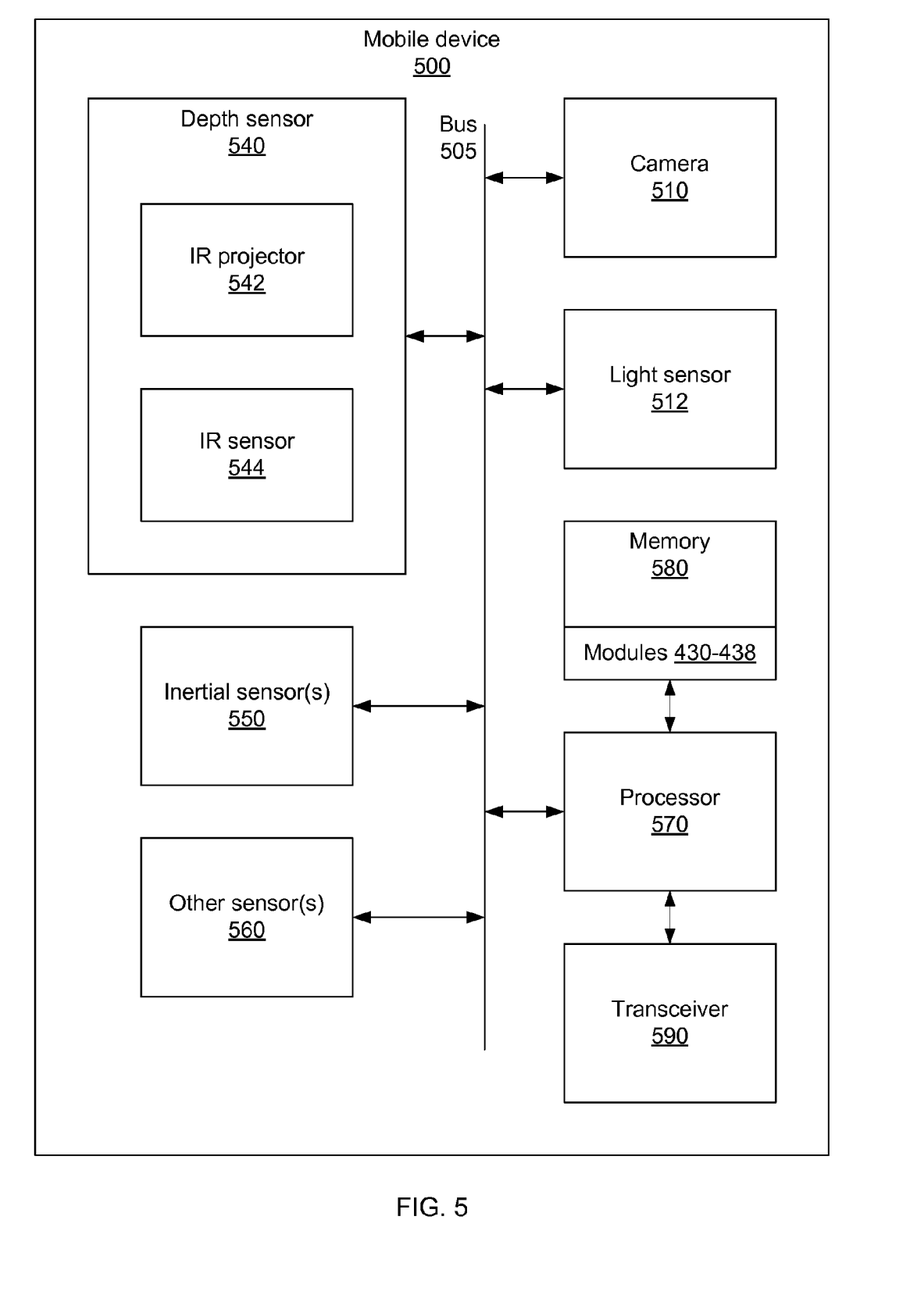
FIG. 5 shows a mobile device, in accordance with some embodiments of the present invention.

FIG. 5 shows a mobile device 500, similar to mobile device 300, in accordance with some embodiments of the present invention. The mobile device 500 includes a camera 510, a light sensor 512, a depth sensor 540, one or more inertial sensors 550, one or more other sensors 560, a processor 570, a memory 580 and a transceiver 590 coupled together optional by a bus 505, coupled together by multiple busses and/or directly coupled.

The camera 510, similar to camera 410 or other image capture device, captures a plurality of images and provides the images to modules in the processor 570. The camera 510 or image capture device acts as a means for capturing an image, a first image and a second image, or a plurality of images. The light sensor 512, similar to light sensor 412, measures an ambient light level at the mobile device 500. The light level may be determined from an image from the camera 510 or directly with a light sensor 512.

The depth sensor 540, similar to depth sensor 340, may include an IR (infrared) projector 542 and an IR sensor 544. The depth sensor 540 acts as a means for capturing single depth map, a first depth map and a second depth map, or a plurality of depth maps. The IR projector 542 projects IR light and the IR sensor 544 receives reflections of the projected IR light. The one or more inertial sensors 550, similar to inertial sensors 450, may include an accelerometer, a gyroscope and/ or the like. The one or more other sensors 560 may include a magnetometer or compass, a step sensor, a proximity sensor, a GNSS sensor, etc.

The processor 570 may be one or more general purpose or specific purpose processor(s) as described below. The processor 570 may act as means for comparing a first measurement to a first threshold, means for setting a first comparison, means for enabling a depth sensor 540 based on the first comparison, means for computing a depth sensor pose from a first depth map and a second depth map, and/or means for feeding the depth sensor pose to a pose tracking filter module 322'. The processor 570 may act as means for computing a pose based at least in part on at least one of a plurality of images, means for sending the pose to a pose tracking filter module, means for comparing a first measurement to a first threshold to determine that the first measurement exceeds the first threshold, and/or means for enabling a depth sensor based, at least in part, on comparing the first measurement, means for receiving a first depth map. The processor 570 may act as means for comparing a second measurement to the first threshold to determine that the second measurement exceeds the first threshold, means for disabling the depth sensor based on comparing the second measurement, and/or means for computing an estimated pose from the pose tracking filter module.

The processor 570 may include memory 580 and/or memory 580 may be separate from the processor 570. Memory 580 includes software code for modules 430-438. The transceiver 590 is coupled to the processor 570 directly (as shown) or indirectly (e.g., via bus 505). The transceiver 590 includes a receiver and a transmitter and allows the mobile device 500 to communicate via a WWAN (wireless wide area network) and/or a WLAN (wireless local area network) and/or a WPAN (wireless personal area network), such as on a cellular channel and/or a WiFi channel and/or a Bluetooth channel, respectively.

FIGS. 6 through 9 show methods 600, 700 and 800 in a mobile device 500 to minimize the use of a depth sensor 540 while filling gaps left by other sensors, in accordance with some embodiments of the present invention.

Figure 6:
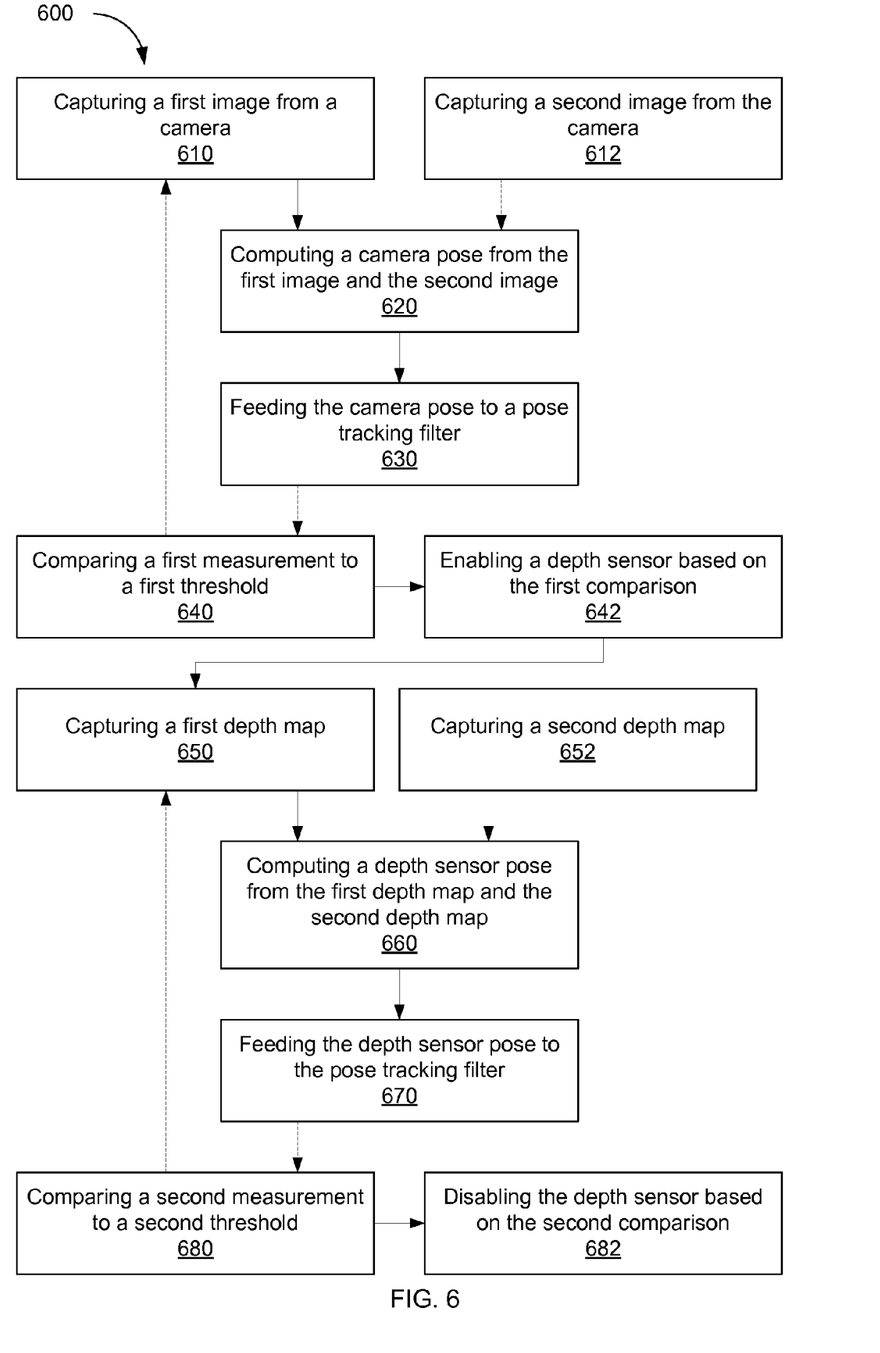
FIGS. 6 through 8 show methods in a mobile device to minimize the use of a depth sensor while filling gaps left by other sensors, in accordance with some embodiments of the present invention.

In FIG. 6, a method 600 show processing in a mobile device 500 of enabling a depth sensor 540 when images from a camera 510 are inadequate. Inadequate images may provide erroneous pose results. Inadequate images, for example, are from a mobile device 500 moving or accelerating too quickly, or with inertial sensor measurements that are too noisy. An inadequate image may be too dark, too bright or too blurry. Inadequate images may arrive too slowly. Inadequate images may comprise a logical combination of two or more for these indicators.

At 610, a camera 510 of a mobile device 500 captures a first image. Alternatively, a processor 570 in the mobile device 500 acquires a first depth map in place of the first image. At 612, the camera 510 captures a second image. Alternatively, a processor 570 in the mobile device 500 acquires a second depth map or a model of an object instead of a second image.

At 620, a camera-based pose determination module 320 of a processor 570 in the mobile device 500 computes a camera pose from a first image and the second image. Alternatively, the processor 570 may compute a pose from changes between the first image or the first depth map and the second image, the second depth map or the model of an object. Alternatively, the processor 570 may compute a pose from a first depth map image and the second image.

At 630, the processor 570 feeds the camera pose to a pose tracking filter module 322 or a pose tracking filter module 322'. As long as one, all or a particular combination of indicators indicate measurements or images are adequate in 640, processing repeats at 610. A second image from one calculation may become a first image of the next calculation. Some embodiments implement an exclusive OR (XOR) operation where the camera pose is fed to the pose tracking filter module 322 at a time when a depth sensor pose is not fed to the pose tracking filter module 322. In other embodiments, the camera pose is fed to the pose tracking filter module 322' when available and without regard to a depth sensor pose being available, even if images are deem inadequate. In some embodiments, an indicator of adequacy is fed to the pose tracking filter module 322'

At 640, the processor 570 compares a first measurement to a first threshold to result in a first comparison. The act of comparing may be to determine whether the first measurement is greater than or less than the first threshold. The first measurement may be derived from one or more inertial sensors 550, a light sensor 512 or a camera 510 and fed to any of modules 430-438 as describe with respect to FIG. 4. Alternatively, the processor 570 compares one or more inertial sensor measurements and/or one or more images to a plurality of respective thresholds to result in a plurality of comparisons or multiple indicators. A depth sensor trigger module 428 combines the multiple indicators to result in a depth sensor on/off signal. The depth sensor on/off signal is used to enable and disable the depth sensor 540.

At 642, the processor 570 enables a depth sensor 540 based on the first comparison. Alternatively, the processor 570 enables a depth sensor 540 based on the depth sensor on/off signal. That is, the depth sensor 540 may be enable when images are (or expected to be) inadequate and disable when images are (or expected to be) adequate again.

At 650, the depth sensor 540 captures a first depth map. At 652, if a second a depth sensor 540 is need, the depth sensor 540 captures the second depth map. At 660, a depth sensor-based pose determination module 324 of the processor 570 computes a depth sensor pose from the first depth map or the first image and the second depth map, the model or the second image. For example, depth sensor-based pose determination module 324 computes the depth sensor pose from the first depth map and the second depth map. In other embodiment, a depth sensor-based pose determination module 324 does not need a second depth map to compute a pose. In these other embodiments, the depth sensor-based pose determination module 324 compares a first depth map to a map of the scene or model of an object computed in prior operation to compute a depth sensor pose. In this manner, depth sensor-based pose determination module 324 may compute a camera pose from just a depth map with a map of the scene or model of an object.

At 670, the processor 570 feeds the depth sensor pose to a pose tracking filter module 322 or a pose tracking filter module 322'. As long as one, more than one, a particular combination or all indicators (e.g., motion, light, frequency, etc.) indicate inertial sensor measurements or camera images are inadequate (or expected to be inadequate) by 680, processing continues at 650. A second depth map from one calculation may become a first depth map of the next calculation.

At 680, when the indicators indicate inertial sensor measurements or images from the camera 510 remain (or are expected to remain) inadequate, processing repeats at 650. On the other hand, when the indicators indicate measurements or images from the camera 510 are (or are expected to be) adequate again, processing disables the depth sensor 540. That is, at 680, the processor 570 compares inertial sensor measurements to a threshold and/or an image. The one or more comparison results determine whether to disable the depth sensor 540. Again, the second measurement may be derived from the one or more inertial sensors 550, the light sensor 512 or the camera 510 and fed to any of modules 430-438 as describe with respect to FIG. 4. At 682, the processor 570 disables the depth sensor 540 based on the one or more comparison results.

Figure 7:
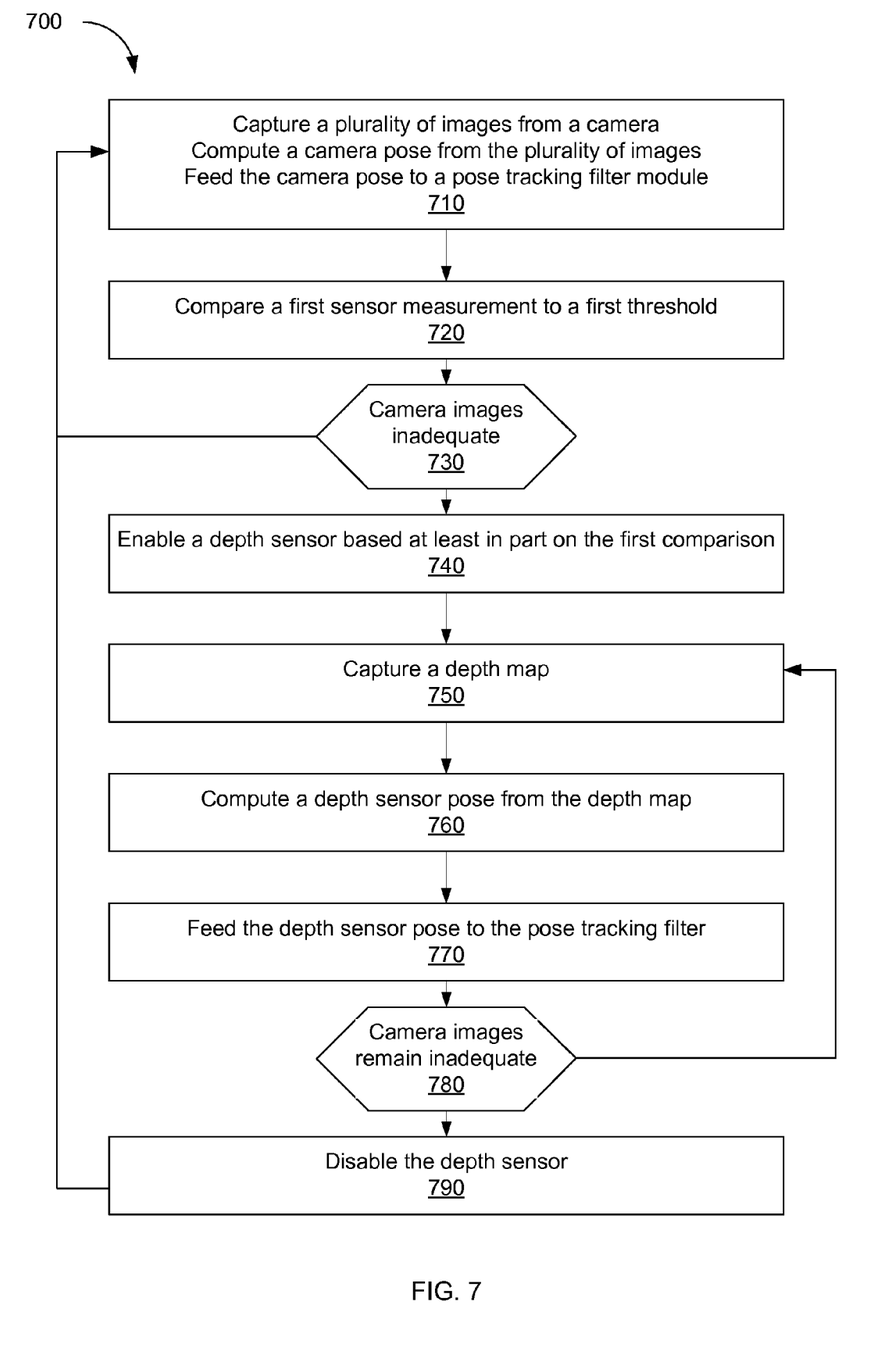

In FIG. 7, a method 700 in a mobile device 500 is shown. At 710, a processor 570 of the mobile device 500 captures a plurality of images with a camera 510, computes a camera pose from the plurality of images, and then feeds the camera pose to a pose tracking filter module 322.

At 720, the processor 570 compares a first sensor measurement to a first threshold to form a comparison result. If the first sensor measurement exceeds a first threshold (either higher or lower than the first threshold), images from the camera 510 may be inadequate. In some embodiment, a threshold is a minimum-allowable value. In some embodiment, a threshold is a maximum-allowable value. Alternatively, multiple comparisons may be used. For example, the processor 570 compares one or more inertial sensor measurements and/or one or more other sensor measurements and/or one or more camera sensor images and/or the like with a plurality of corresponding thresholds. Each comparison result may be fed to a depth sensor trigger module 428. Similar to a first comparison result, the depth sensor trigger module 428 may produce a depth sensor on/off signal, as shown in FIG. 4.

At 730, the processor 570 determine whether camera images have become inadequate, or are expected to be inadequate based on the first comparison result or the depth sensor on/off signal. If an image is not inadequate, processing loops back to step 710. If an image is inadequate, processing continues to step 740.

At 740, the processor 570 enables a depth sensor 540 based at least in part on the comparison result or the depth sensor on/off signal indicating images from the camera 510 are or may be inadequate. In this manner, the processor 570 may replace or supplement erroneous camera pose with the depth sensor pose as described in steps 750-770 as described below.

At 750, the depth sensor 540 captures a depth map. At 760, a depth sensor-based pose determination module 324 computes a depth sensor pose from the depth map. For example, a depth sensor-based pose determination module 324 computes a depth sensor pose based on the depth map and a second depth map. Alternatively, a depth sensor-based pose determination module 324 may compute a depth sensor pose based on the depth map and an image. Alternatively, a depth sensor-based pose determination module 324 may compute a depth sensor pose based on the depth map and a model of an object in the depth map.

At 770, the processor 570 feeds the depth sensor pose to a pose tracking filter module 322 or pose tracking filter module 322'. The depth sensor pose may replace or supplement the camera pose.

At 780, the processor 570 determines whether camera images are still inadequate based on a comparison result or the depth sensor on/off signal as described above. If an image remains inadequate, processing loops back to step 750. If an image is no longer inadequate, processing continues to step 790. An image is adequate again (or expected to be adequate again) when, for example, the inertial sensor measurements indicate the mobile device 500 is moving or accelerating slow enough, the inertial sensor measurements have a low level of noise, a light sensor or image indicates the image is not too dark or bright, the image is not too blurry, and/or images are frequent enough. These indicators and threshold may be the same as discussed above with reference to FIG. 4, or may be different such that a hysteresis is formed between enabling and disabling the depth sensor 540. At 790, when images are adequate again or a time-out occurs, the depth sensor 540 may be disabled to save battery power.

Figure 8:
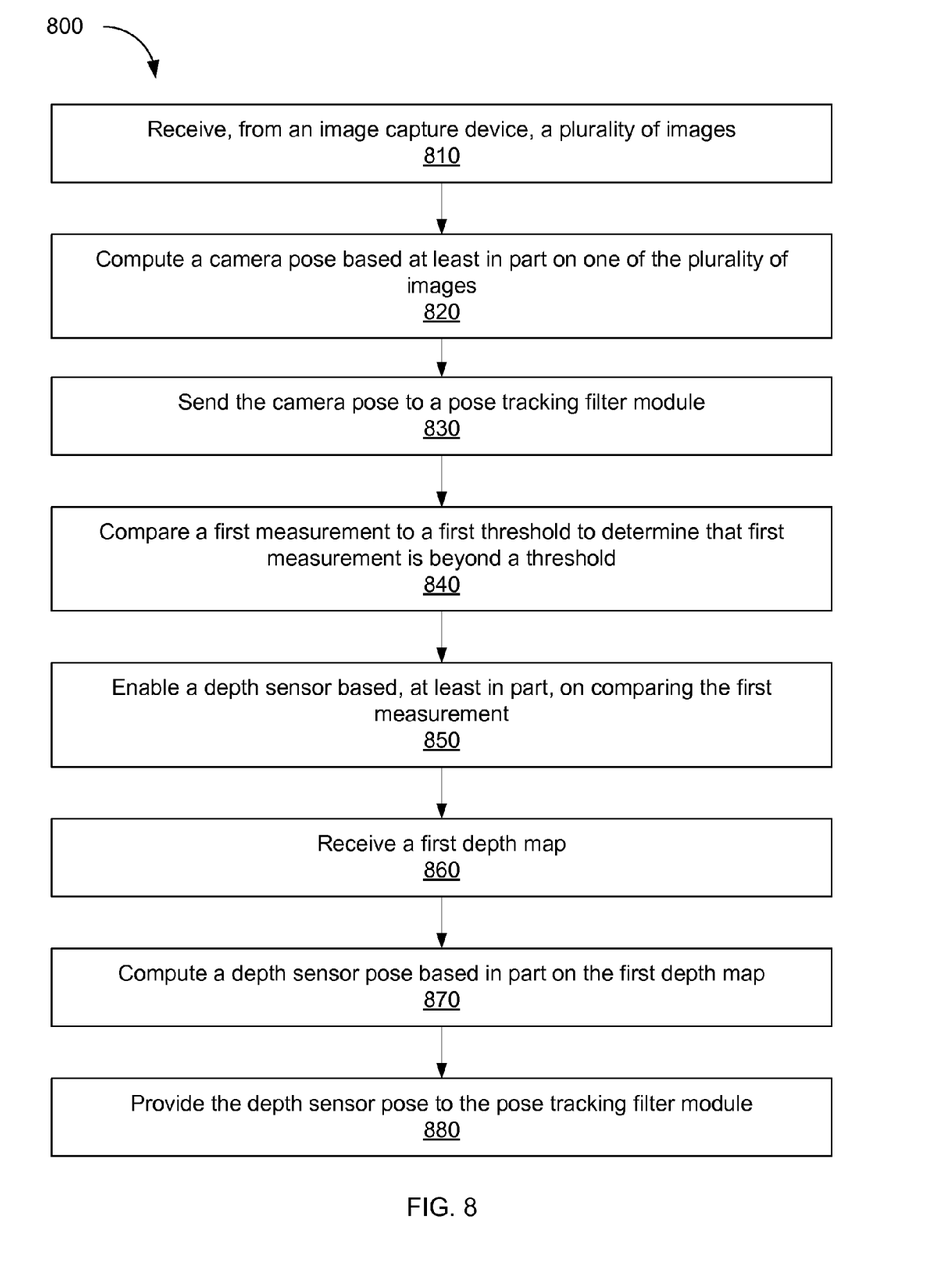

In FIG. 8, a method 800 in a mobile device 500 for tracking pose of the mobile device 500 is shown. At 810, the mobile device 500 receives, from an image capture device, a plurality of images. The image capture device may include a camera 520. The plurality of images may include a first image and a second image.

At 820, the mobile device 500 computes a camera pose based at least in part on one of the plurality of images. Pose may be determined based on one image, two images or several images. At 830, the mobile device 500 sends the camera pose to a pose tracking filter module 322 or 322'.

At 840, the mobile device 500 compares a first measurement to a first threshold to determine that first measurement exceeds the first threshold. The first measurement may be from an inertial sensor 550, a light sensor 412, a camera 512 or other image capture device, or the like. One or more additional measurements may also be compared to a respective threshold and combined to result in a depth sensor triggering signal. At 850, the mobile device 500 enables a depth sensor 540 based, at least in part, on comparing the first measurement.

At 860, the mobile device 500 receives a first depth map. At 870, the mobile device 500 computes a depth sensor pose based in part on the first depth map. The depth sensor pose may supplement or replace the camera pose. At 880, the mobile device 500 provides the depth sensor pose to the pose tracking filter module 322 or 322'.

The method 800 may further comprise capturing a second depth map, wherein computing the depth sensor pose based in part on the first depth map comprises computing the depth sensor pose from the first depth map and the second depth map.

The first measurement may comprise a rate of angular velocity or a rate of angular acceleration obtained from inertial sensor measurements. The first measurement may comprise a noise level of inertial sensor measurements, a light level, an indication of blurriness and/or a frame rate of camera images. The pose tracking filter module 322 or 322' may comprise an extended Kalman filter (EKF) or a particle filter.

The method 800 may further comprise computing an estimated pose from the pose tracking filter module 322 or 322'. The method 800 may further comprise disabling the depth sensor 540. Disabling the depth sensor 540 may comprise comparing a second measurement to the first threshold to determine that the second measurement exceeds the first threshold, and disabling the depth sensor 540 based on comparing the second measurement.

Figure 9:
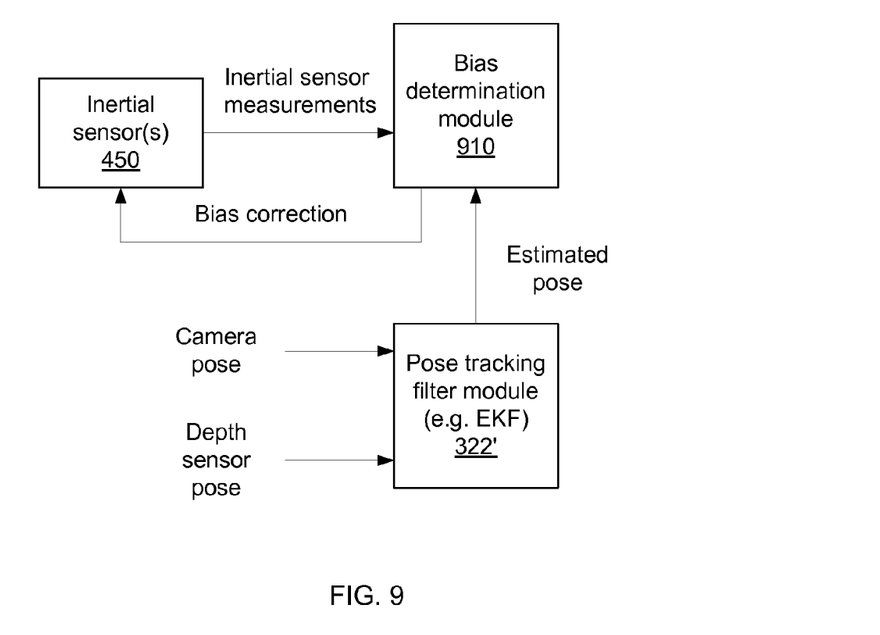
FIG. 9 shows correction of an inertial sensor using estimated pose, in accordance with some embodiments of the present invention.

FIG. 9 shows correction of an inertial sensor 450 using estimated pose, in accordance with some embodiments of the present invention. A pose tracking filter module 322, discussed above, receives a selected one of either a camera pose or a depth sensor pose. The camera pose is received from a camera-based pose computation module 320, for example, of FIG. 3A or 3B, which receives an image from a camera 310 or 510 or other image capture device. The depth sensor pose is received from a depth sensor-based pose computation module 324, for example, of FIG. 3A or 3B, which receives a depth sensor map from a depth sensor 340 or 540. Similarly, a pose tracking filter module 322', discussed above, receives a camera pose and a depth sensor pose. When images from the camera 510 are inadequate.

The depth sensor 540 is enabled and provides a depth sensor map, which in turn, is used to compute the depth sensor pose. The depth sensor pose may be used to replace or supplement the inadequate camera images. The camera pose and/or the depth sensor pose are used by the pose tracking filter module 322 or 322' to form an estimated pose. The estimated pose is fed to a bias determination module 910 to compare an inertial pose to the estimated pose. The inertial pose is determined from inertial sensor measurements. The difference between the inertial pose and the estimated pose is used to compute a bias correction, which is fed back to the inertial sensor 450. The bias correction is used by the inertial sensor 450 to reduce or eliminate inherent inertial sensor bias, thereby improving inertial sensor measurements.

Figure 10:
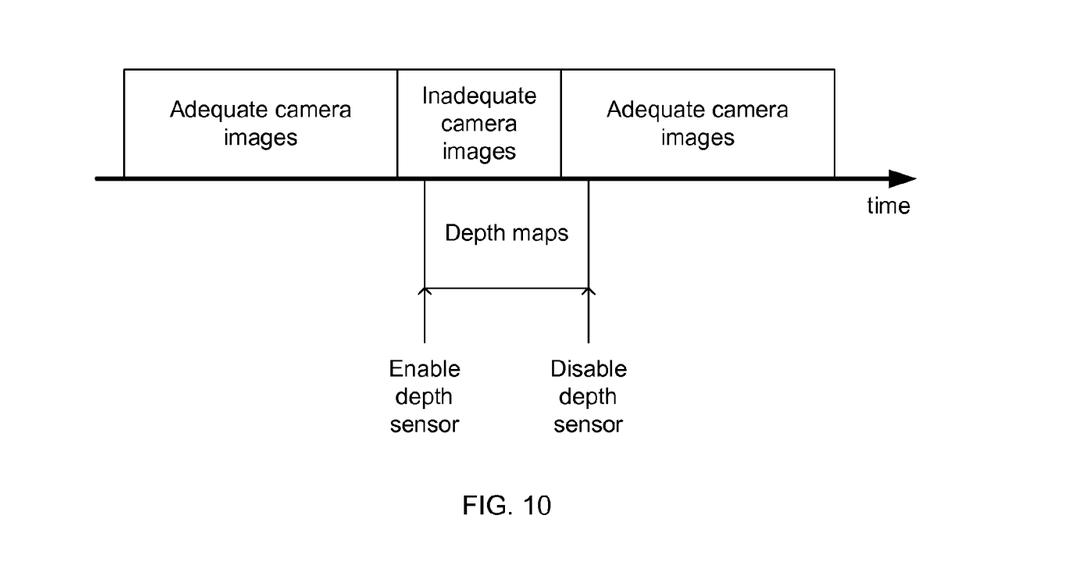
FIG. 10 shows a timeline, in accordance with some embodiments of the present invention.

FIG. 10 shows a timeline, in accordance with some embodiments of the present invention. Images from a camera may toggle between being adequate and inadequate. An image may be or deemed to be inadequate if the pose calculations result in or are expected to result in inaccurate pose calculations. Sensor measurements, such as from an inertial sensor, light, sensor, image sensor, a magnetometer or compass, a step sensor, a proximity sensor, a GNSS sensor, and/or the like, may be used to determine an image is inadequate for pose calculations.

For example, an inertial sensor, a step sensor or GNSS sensor may indicate a mobile device is moving too fast to assure a non-blurry image. Analysis of an image from an image sensor may indicate an image is too blurry, thus an inaccurate pose is expected. Analysis of an image from an image sensor or sensor measurements from a light sensor may indicate an image is too bright to give sufficient detail for pose calculations. Analysis of an image or light sensor measurements may indicate an image is too dark for frequent enough images.

During times when the camera may producing inadequate camera images that may result in inaccurate pose calculations, a depth sensor may be enabled and produce depth maps. Depth maps from a depth sensor may supplement or replace camera images that would alone result in inaccurate pose calculations. Later, a depth sensor may be disabled and depth maps no longer produced when camera images are adequate again.

The methodologies described herein may be implemented by various means depending upon the application. For example, these methodologies may be implemented in hardware, firmware, software, or any combination thereof. For a hardware implementation, the processor(s) or other processing unit(s) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method in a mobile device for tracking pose of the mobile device, the method comprising:
   receiving, from an image capture device, a plurality of images;
   computing a pose based at least in part on one of the plurality of images;
   sending the pose to a pose tracking filter module;
   comparing a first measurement to a first threshold to determine that the first measurement exceeds the first threshold;
   enabling a depth sensor based, at least in part, on comparing the first measurement;
   receiving a first depth map;
   computing a depth sensor pose based in part on the first depth map; and
   providing the depth sensor pose to the pose tracking filter module.

2. The method of claim 1, further comprising disabling the depth sensor.

3. The method of claim 2, wherein disabling the depth sensor comprises:
   comparing a second measurement to the first threshold to determine that the second measurement no longer exceeds the first threshold; and
   disabling the depth sensor based on comparing the second measurement.

4. The method of claim 1, further comprising:
capturing a second depth map;
wherein computing the depth sensor pose based in part on the first depth map comprises computing the depth sensor pose from the first depth map and the second depth map.

5. The method of claim 1, wherein the first measurement comprises a rate of angular velocity or a rate of angular acceleration obtained from inertial sensor measurements.

6. The method of claim 1, wherein the first measurement comprises a noise level of inertial sensor measurements.

7. The method of claim 1, wherein the first measurement comprises a light level.

8. The method of claim 1, wherein the first measurement comprises an indication of blurriness.

9. The method of claim 1, wherein the first measurement comprises a frame rate of images.

10. The method of claim 1, wherein the pose tracking filter module comprises an extended Kalman filter (EKF).

11. The method of claim 1, wherein the pose tracking filter module comprises a particle filter.

12. The method of claim 1, further comprising computing an estimated pose from the pose tracking filter module.

13. A mobile device for tracking pose, the mobile device comprising:
an image capture device configured to capture a plurality of images;
a pose module coupled to the image capture device and configured to compute a pose based at least in part on one of the plurality of images;
a depth sensor configured to send a first depth map;
a comparator module configured to compare a first measurement to a first threshold to determine that the first measurement exceed the first threshold;
a depth sensor trigger module coupled to the depth sensor and the comparator module, and configured to enable the depth sensor based, at least in part, on comparing the first measurement;
a depth sensor pose module coupled to the depth sensor and configured to compute a depth sensor pose based in part on the first depth map; and
a pose tracking filter module:
coupled to the pose module and the depth sensor pose module;
configured to receive the pose and the depth sensor pose; and
provide an estimated pose.

14. The mobile device of claim 13, further comprising an inertial sensor, wherein the first measurement comprises a measurement from the inertial sensor.

15. The mobile device of claim 13, further comprising a light sensor, wherein the first measurement comprises a measurement from the light sensor.

16. The mobile device of claim 13, wherein the first measurement comprises an indication of blur from the image capture device.

17. The mobile device of claim 13, wherein the first measurement comprises a frame rate of images from the image capture device.

18. The mobile device of claim 13, further comprising a processor and memory couple to the image capture device and the depth sensor, and comprising code for:
the comparator module;
the depth sensor trigger module;
the depth sensor pose module; and
the pose tracking filter module.

19. A mobile device for tracking pose of the mobile device, the mobile device comprising:
means for receiving, from an image capture device, a plurality of images;
means for computing a pose based at least in part on one of the plurality of images;
means for sending the pose to a pose tracking filter module;
means for comparing a first measurement to a first threshold to determine that the first measurement exceeds the first threshold;
means for enabling a depth sensor based, at least in part, on comparing the first measurement;
means for receiving a first depth map;
means for computing a depth sensor pose based in part on the first depth map; and
means for providing the depth sensor pose to the pose tracking filter module.

20. The mobile device of claim 19, further comprising means for disabling the depth sensor comprises:
means for comparing a second measurement to the first threshold to determine that the second measurement exceeds the first threshold; and
means for disabling the depth sensor based on comparing the second measurement.

21. The mobile device of claim 19, wherein the first measurement comprises at least one of:
a rate of linear acceleration from inertial sensor measurements;
a rate of angular acceleration from inertial sensor measurements;
a noise level of inertial sensor measurements;
a light level;
an indication of blurriness; or
a frame rate of images.

22. The mobile device of claim 19, further comprising means for computing an estimated pose from the pose tracking filter module.

23. A non-transient computer-readable storage medium including program code stored thereon, comprising program code for a mobile device for tracking pose of the mobile device, the program code comprising code to:
receive, from an image capture device, a plurality of images;
compute a pose based at least in part on one of the plurality of images;
send the pose to a pose tracking filter module;
compare a first measurement to a first threshold to determine that the first measurement exceed the first threshold;
enable a depth sensor based, at least in part, on comparing the first measurement;
receive a first depth map;
compute a depth sensor pose based in part on the first depth map; and
provide the depth sensor pose to the pose tracking filter module.

24. The non-transient computer-readable storage medium of claim 23, wherein the first measurement comprises at least one of:
a rate of linear acceleration from inertial sensor measurements;
a rate of angular acceleration from inertial sensor measurements;
a noise level of inertial sensor measurements;
a light level;
an indication of blurriness; or
a frame rate of images.

25. The non-transient computer-readable storage medium of claim 23, wherein the program code further comprises code to compute an estimated pose from the pose tracking filter module.

26. The non-transient computer-readable storage medium of claim 23, wherein the program code further comprises code to:
   compare a second measurement to the first threshold to set a second comparison; and
   disable the depth sensor based on the second comparison.

* * * * *